United States Patent [19]

Hardt et al.

[11] 4,276,391

[45] Jun. 30, 1981

[54] HIGH-IMPACT THERMOPLASTIC VINYL CHLORIDE POLYMER MOULDING COMPOSITION

[75] Inventors: Dietrich Hardt, Cologne; Gert Humme, Odenthal; Karl-Heinz Ott, Leverkusen; Hans-Eberhard Braese, Cologne, all of Fed. Rep. of Germany

[73] Assignee: Bayer Aktiengesellschaft, Leverkusen, Fed. Rep. of Germany

[21] Appl. No.: 104,183

[22] Filed: Dec. 17, 1979

Related U.S. Application Data

[63] Continuation of Ser. No. 887,735, Mar. 17, 1978, abandoned, which is a continuation of Ser. No. 707,548, Jul. 22, 1976, abandoned.

[30] Foreign Application Priority Data

Jul. 30, 1975 [DE] Fed. Rep. of Germany ....... 2534013

[51] Int. Cl.$^3$ .................... C08L 51/04; C08L 57/08
[52] U.S. Cl. .................. 525/71; 260/45.8 N
[58] Field of Search .......................... 525/71

[56] References Cited

U.S. PATENT DOCUMENTS

| | | | |
|---|---|---|---|
| 2,802,809 | 8/1957 | Hayes | 525/71 |
| 3,287,433 | 11/1966 | Saito et al. | 525/71 |
| 3,636,138 | 1/1972 | Beer | 525/71 |
| 3,644,577 | 2/1972 | Lee et al. | 525/71 |
| 3,678,132 | 7/1972 | Isogawa et al. | 525/71 |
| 3,683,050 | 8/1972 | Meredith et al. | 525/71 |
| 3,775,514 | 11/1973 | Amagi et al. | 525/71 |
| 4,042,548 | 7/1977 | Abe et al. | 525/71 |

FOREIGN PATENT DOCUMENTS

| | | | |
|---|---|---|---|
| 1203959 | 10/1965 | Fed. Rep. of Germany | 525/71 |
| 1745945 | 3/1971 | Fed. Rep. of Germany | 525/71 |

OTHER PUBLICATIONS

Du Pont Dev. Prods. Bulletin, No. 18, Dec. 1961.
Du Pont Dev. Prods. Bulletin, No. 20, May 1963.
Ham, J. Poly. Sci., pp. 543-545 (1959).

*Primary Examiner*—J. Ziegler
*Attorney, Agent, or Firm*—Connolly and Hutz

[57] ABSTRACT

Thermoplastic moulding compositions of
(1) 75 to 99 parts by weight of vinyl chloride polymers containing from 1 to 10% by weight of ethylene vinyl ester copolymers, and
(2) 1 to 25 parts by weight of graft polymers of styrene and/or methyl methacrylate or of styrene and acrylonitrile and, optionally, methyl methacrylate on an ethylene-propylene terpolymer rubber.

5 Claims, No Drawings

HIGH-IMPACT THERMOPLASTIC VINYL CHLORIDE POLYMER MOULDING COMPOSITION

This application is a continuation of application Ser. No. 887,735 filed Mar. 17, 1978, which in turn is a continuation of Ser. No. 707,548 filed July 22, 1976, now each abandoned.

This invention relates to thermoplastic high-impact vinyl chloride-polymer moulding compositions with high toughness, excellent processing properties and high resistance to light and ageing.

The moulding compositions according to the invention comprise
  (1) 75 to 99 parts by weight of vinyl chloride polymers containing from 1 to 10% by weight of ethylene vinyl ester copolymers, and
  (2) 1 to 25 parts by weight of graft polymers of styrene and/or methyl methacrylate or of styrene and acrylonitrile and, optionally, methyl methacrylate on an ethylene-propylene terpolymer rubber.

(A) Vinyl chloride polymers

In the context of the invention, vinyl chloride polymers containing from 1 to 10% by weight of ethylene vinyl ester copolymer are
  (a) physical mixtures of polyvinyl chloride (or its copolymers) with the corresponding quantity of ethylene vinyl ester copolymer,
  (b) graft polymers of vinyl chloride on the corresponding quantity of ethylene vinyl ester copolymer, or
  (c) mixtures of polyvinyl chloride (or its copolymers) and (b) with the corresponding ethylene vinyl ester copolymer content.

The homopolymer of vinyl chloride is preferably used. However, it is also possible to use copolymers having up to 20% by weight of other copolymerisable monomers. Suitable comonomers are, for example, ethylene, propylene, butylene, vinyl esters of monocarboxylic acids, diesters of $\alpha,\beta$-unsaturated dicarboxylic acids, their anhydrides, their simple and substituted amides, acrylonitrile and vinylidene chloride. The vinyl chloride polymers containing from 1 to 10% by weight of ethylene vinyl ester copolymer preferably have K-values (according to Fikentscher, Zeitschrift fur Cellulose-Chemie, 13, 1932, page 58) of from 50 to 85. They may be obtained in known manner by suspension, emulsion or bulk polymerisation. The graft polymers (b) are preferably produced by suspension polymerisation.

(B) Ethylene vinyl ester copolymers

In the context of the invention, ethylene vinyl ester copolymers are preferably copolymers of from 80 to 20% by weight and, with particular preference, 75 to 45% by weight of ethylene and correspondingly from 20 to 80% by weight, with particular preference 25 to 55% by weight, of vinyl ester with Mooney viscosities (ML-4' at 100° C.) of from 5 to 60 and $\eta$-values (dimethyl formamide, 25° C.) of from 0.2 to 5.0 [100 ml/g.]. They may be obtained in known manner, for example by emulsion, solution, bulk, suspension or precipitation polymerisation or by combination of these processes. The preferred vinyl ester is vinyl acetate.

(C) Graft polymers of styrene and/or methyl methacrylate or of styrene and acrylonitrile and, optionally, methyl methacrylate on ethylene-propylene terpolymer rubbers The graft bases of these products are so-called ethylene-propylene terpolymer rubbers, referred to in short as EPDM-rubbers (ethylene-propylene-diene monomer). They are copolymers of ethylene and propylene in a ratio by weight of from 75:25 to 40:60 which contain an unconjugated diene in copolymerised form. This diene is present in the copolymer in such a quantity that the polymer contains approximately 1 to 15 carbon-carbon double bonds per 1000 carbon atoms, corresponding to an iodine number of approximately 2 to 30. Particularly preferred unconjugated dienes are dicyclopentadiene, 1,4-hexadiene, 5-ethylidene norbornene or their homologues (other alkylidene norbornenes, tricyclopentadiene, heptadiene or octadiene), either individually or in combination. It is preferred to use EPDM-rubbers with Mooney viscosities (ML-4'; 100° C.) of from 20 to 150. It is also possible to use mixtures of EPDM-rubbers and ethylene vinyl ester copolymers and to mix the graft polymers obtained with polyvinyl chloride. Graft monomers are
  (a) styrene and/or methyl methacrylate, or
  (b) styrene, acrylonitrile and, optionally, methyl methacrylate.

The monomer mixtures should contain no more than 50% by weight of acrylonitrile. The styrene may be completely or partly replaced by $\alpha$-methyl styrene. Mixtures of styrene and acrylonitrile are particularly preferred.

Particularly preferred graft copolymers of this type are those in which the following ratios by weight are observed:

$$1 < \frac{\text{styrene}}{\text{acrylonitrile}} < 9$$

$$0.3 < \frac{\text{graft base}}{\text{graft monomer}} < 4$$

in particular $$1.5 < \frac{\text{styrene}}{\text{acrylonitrile}} < 4 \qquad 0.5 < \frac{\text{graft base}}{\text{graft monomer}} < 2.5$$

Graft polymerisation

Graft polymerisation means polymerisation of the graft monomers in the presence of the graft base. During the reaction, part of the monomers is polymerised onto the graft base in the form of a side chain. This part of the preformed polymer is chemically attached to the graft base. In addition, free polymer of the graft monomers is formed. The ratio by weight of the polymer chemically attached (grafted) to the graft base to the free polymer is known as the degree of grafting. This degree of grafting and the molecular weight both of the grafted polymer and of the free polymer are governed to a very considerable extent by the polymerisation conditions (temperature, activation, molecular weight regulation, solvents, stirring conditions and quantities of monomer). Accordingly, the polymerisation conditions have to be carefully selected to obtain products with optimum properties.

The polymerisation activator, polymerisation velocity and polymerisation temperature are related to one another. For a given polymerisation temperature, it is possible to select suitable activators on the basis of the half lives tabulated in the literature, and vice versa.

The graft polymerisation reaction requires temperatures of at least 80° C., preferably in the range of from 100° to 140° C. and with particular preference in the range of from 110° to 130° C.

Peroxide activators, such as di-tert.-butyl peroxide, cumene hydroperoxide, tert.-butyl hydroperoxide and dicumyl peroxide are particularly suitable.

In cases where reducing agents are added, it is also possible to use activators of which the rate of decomposition at the temperature specified is too low.

Suitable molecular weight regulators are relatively long chain mercaptans, terpinolenes and α-olefins.

The polymerisation process used in accordance with the invention is preferably solution polymerisation carried out preferably in aromatic hydrocarbons with a boiling point (b.p. $_{760}$) of from 80° to 150° C. Benzene and toluene are preferably used.

It is preferred to work with concentrations, i.e. with a ratio by weight of solvent to graft monomers + graft base of from 2.5:1 to 10:1, the preferred ratio for benzene being $\leq$10:1 and for toluene <5:1.

Isolation of the EPDM-graft polymer

The EPDM-graft polymer is preferably isolated by stripping and concentration by evaporation in evaporation screws.

Production of the moulding compositions according to the invention

Conventional high-speed mixers and mixing rolls are suitable for mixing and compounding. It is possible to start with powder-form material or with granulated material. The compositions plasticised on rolls or in kneaders may also be pressed or calendered. Powder mixtures and granulates may be extruded, injection-moulded or blow-moulded by known methods.

The moulding compositions according to the invention may contain conventional PVC-stabilisers, i.e. stabilising systems based on lead, barium/cadmium, calcium/zinc, organotin compounds or organic stabilisers such as, for example α-phenyl indole, diphenyl thiourea, α-aminocrotonic acid esters or epoxidised fatty acid esters, either individually or in combination. It is also possible to add lubricants for polyvinyl chloride.

Polymer and monomer plasticisers may be added either individually or in combination to the moulding compositions. It is also possible to add physical or chemical blowing agents in order to obtain a foam structure under suitable processing conditions.

Conventional processing aids and flow aids may be added, just as in the processing of pure or high-impact polyvinyl chloride. Antistatic agents, UV-absorbers, antioxidants, flameproofing agents, pigments and fillers may also be added.

The moulding compositions contain at most 25% by weight of EPDM-graft polymer. The maximum EPDM-rubber content of the moulding compositions is preferably 18% by weight. Instead of using a single graft polymer it is also possible to use mixtures of EPDM-graft polymers with different ratios of graft base to graft monomers and/or of EPDM-graft polymers containing different EPDM-rubbers.

Instead of using pure EPDM-graft polymers, it is also possible to use mixtures of the graft polymers with copolymers of the graft monomers.

Properties and uses of the moulding compositions according to the invention

The compositions according to the invention may be used as thermoplastic moulding compositions and represent more or less hard, but very tough products of the high-impact polyvinyl chloride type. They re extremely tough, even at temperatures of down to −40° C. Hardness, tensile strength, flexural strength and E-modulus comply with the requirements which regid polyvinyl chloride to satisfy.

The moulding compositions may be processed at temperatures of up to 240° C. and, hence, are much more reliable in processing than standard high-impact polyvinylchloride.

Finally, they show particularly high stability to light and aging.

The moulding compositions according to the invention are used primarily for the production of profiles, extruded sheeting and injection-moulded articles. Applications for profiles are most important in the building and furniture field, for example window profiles, door frames, balcony linings, eave gutters, sign posts for orads, protective edges for stairs, curtain rails, pickets, bench profiles, different kinds of tiles for lining walls, etc. By injection moulding, it is possible to product for example domestic and utility articles, small parts for the vehicle industry, housings for office machines and electrical appliances, and also furniture and parts of furniture. Potential applications for calendered films are in the packaging field, whilst specially coloured and patterned films may be used as a veneer and lining material in the furniture industry. High-impact bottles may be produced by the extrusion blowing process.

EXAMPLES

Description of the production of the starting products used in the Examples:

1. Production of the EPDM/EVA-graft polymers

The EPDM/EVA-graft polymers are produced in accordance with the following general recipe:
E parts by weight of EPDM-rubber, and optionally
V parts by weight of EVA-copolymer are dissolved in
L parts by weight of solvent.
S parts by weight of styrene and
A parts by weight of acrylonitrile are added and the solution is heated to
T° C. (=polymerisation temperature). After the addition of
J parts by weight of initiator, polymerisation is carried out for
t hours at the above-mentioned polymerisation temperature. The monomer conversions obtained amount to >98%. The polymer solution has added to it, based on the sum: E+S+A+V, 0.5 part by weight of a phenolic antioxidant (2,6-di-tert.-butyl-p-cresol) and 0.5 part by weight of a co-stabiliser (dilauryl thiodipropionate), after which the polymer product is isolated by stripping. The crumbs obtained are dried at 70° C. in a vacuum drying cabinet.
Polymerisation vessel: V2A-steel, designed for pressures of up to 6 bars, wall-sweeping stirrer designed for viscosities of >1000 poises.
Stripper: standard stripper of the kind commonly used in rubber technology.

The various EPDM and EPDM/EVA-graft polymers are shown in Table 1.

Since the monomer conversion amounts of $\geq$98%, it is assumed for the purposes of further discussion that the rubber content of the graft polymer=quantity of EPDM or EPDM/EVA-rubber (E) used for the grafting reaction.

TABLE 1

| No. of the EPDM or EPDM/EVA-graft polymer | 1 | 2 | 3 | 4 | 5 |
|---|---|---|---|---|---|
| Solvent (L)* | | | | | |
| Type | T | B | T | T | T |
| Quantity | 300 | 500 | 300 | 300 | 300 |
| EPDM-rubber (E) | | | | | |
| Quantity of rubber | 50 | 50 | 45 | 30 | 80 |
| Diene component** | DCPD | EN | EN | EN | EN |
| Iodine number | 12 | 24 | 24 | 24 | 24 |
| Mooney value (ML 1-4', 100° C.) | 70 | 90 | 90 | 90 | 90 |
| Ethylene/vinyl acetate copolymer (V) of the EVA 3 type | — | — | — | — | — |
| Graft monomer | | | | | |
| Styrene (S) | 37.5 | 37.5 | 41.3 | 52.5 | 15 |
| Acrylonitrile (A) | 12.5 | 12.5 | 13.7 | 17.5 | 5 |
| Polymerisation temperature | 120 | 120 | 120 | 120 | 120 |
| Initiator (J)*** | | | | | |
| Peroxide | DTBP | DTBP | DTBP | DTBP | DTBP |
| Quantity | 0.9 | 0.9 | 0.9 | 1.25 | 0.3 |
| Polymerisation time (t) | 14 | 14 | 14 | 14 | 14 |

*B = benzene  T = toluene
**EN = 5-ethylidene-2-norbornene  DEPD = dicyclopentadiene
***DTBP = di-tert.-butyl peroxide

2. Description of the PVC-types used

A suspension PVC with a K-value of 68 (Vestolit VS 6858, a product of Chemische Werke Huls) is used for producing the thermoplastic moulding compositions. This suspension PVC is prestabilised as described below to form two different types and is subsequently further processed to produce the PVC moulding compositions according to the invention.

The PVC stabilised with a tin compound is produced as follows:

Polyvinyl chloride-type Y 100 parts by weight of suspension polyvinyl chloride with a K-value of 68 are mixed with 1.5 parts by weight of di-n-octyl tin thioglycolic acid ester for 5 minutes in a high-speed mixer (2000 rpm), the temperature rising to 120° C. This is followed by cooling to room temperature at a reduced stirrer speed.

The PVC stabilised with a barium/cadmium compound is produced as follows:

Polyvinyl chloride-type Z 100 parts by weight of suspension polyvinyl chloride with a K-value of 68 are mixed for 5 minutes in a high-speed mixer (2000 rpm) with 2.5 parts by weight of a barium/cadmium complex (Mark WSX, Argus Chemicals), 0.5 part by weight of epoxidised soya bean oil, 0.5 part by weight of organic phosphite (Naftovin KX 140, a product of Metallsgesellschaft, Frankfurt), 0.5 part by weight of montanic acid ester, 0.3 part by weight of fatty acid/fatty alcohol ester (barolub LPM, 1 product of Chemische Werke Barlocher GmbH, Munich), the temperature rising to 120° C. This is followed by cooling to room temperature at a reduced stirrer speed.

3. Description of the ethylene/vinyl acetate copolymer (in short EVA-copolymer) used The copolymers of ethylene and vinyl acetate used for producing the mixtures according to the invention are characterised by their VAC-content, their Mooney viscosity (DIN 53 523, ML 4' at 100° C.) and by their $\eta$-value (intrinsic viscosity, measured in dimethyl formamide at 25° C.).

The following products are used:

| | VAC-content % by weight | Mooney | $\eta$-value |
|---|---|---|---|
| EVA 1 | 39 | 21 | 1.0 |
| EVA 2 | 43 | 18 | 0.9 |
| EVA 3 | 45 | 22 | 1.1 |
| EVA 4 | 32 | 11 | 0.7 |
| EVA 5 | 51 | 14 | 0.8 |

4. Description of the graft polymers of vinyl chloride on ethylene/vinyl acetate (EVA) copolymer used (a) Graft polymer P 1

This graft polymer consists of 50% by weight of an ethylene vinyl acetate copolymer with a vinyl acetate content of 43% by weight, type EVA 2, and 50% by weight of polyvinyl chloride. It is produced in accordance with DT-OS 1,495,694. The graft product has a K-value, as measured in cyclohexanone at 25° C., of 75.

(b) Graft polymer P 2

This graft polymer consists of 10% by weight of an ethylene/vinyl acetate copolymer with a vinyl acetate content of 45% by weight, type EVA 3, and 90% by weight of polyvinyl chloride. It is produced in accordance with DT-OS No. 1,495,694. The graft product has a K-value, as measured in cyclohexanone at 25° C., of 68.

The graft polymer of type P 2 is prestabilised in the same way as the PVC type Z (paragraph 2).

5. Preparation of the mixtures according to the invention

To prepare the mixtures according to the invention, the products described in paragraphs 1 to 4 are intensively homogenised for 10 minutes on laboratory mixing rolls in the mixing ratios quoted in the individual Examples at temperatures of 170°, 180°, 190° and 200° C., unless otherwise stated. The rough sheets drawn off at the individual temperatures are then preheated at the same temperature for 7 minutes in the absence of pressure in a press, followed by moulding under pressure for 3 minutes to form sheets which are used for the production of standard test specimens. The mixtures according to the invention may, of course, also be produced, in accordance with standard PVC technology, by premixing all the components with the PVC stabiliser in a high speed laboratory mixer before distribution onto the mixing rolls, followed by homogenisation on the mixing rolls.

6. Mechanical tests

The mechanical testing of the polymer blends was carried out in accordance with the Standards quoted below:
Impact strength $a_n$, DIN 53 453 (kJ/m$^2$) temperatures: room temperature
Notched impact strength $a_k$, DIN 53 453 (kJ/m$^2$) room temperature, 0° C., −20° C.
Vicat temperature: DIN 53 460(°C.)
Bending stress $\delta_{bf}$: DIN 53 452 (MPa)
Ball indentation hardness $H_{c,\,30''}$: DIN 53 456 (MPa)

7. Aging tests

The following apparatus were used for these tests:
Weatherometer
Conditions: carbon arc lamp. Rotating specimen drum and spraying unit
Raining cycle:
  17 minutes' exposure
  3 minutes' exposure and spraying
Black panel temperature:
  before spraying: 42° C.
  after spraying: 22° C.

The toughness properties, determined in dependence upon the particular processing temperature used, of a high impact polyvinyl chloride produced from polyvinyl chloride and an EVA/PVC-graft polymer (1:1), and of the mixture according to the invention which additionally contains an EPDM-graft polymer, are compared in the following Example:

| Mixture | Composition | $H_c$,30" (MPa) | $a_k$,23° C. (kJ/m$^2$) | Vicat (°C.) | $\sigma$bF (MPa) | Processing temp. °C. |
|---|---|---|---|---|---|---|
| I A 1 | 84 parts by weight of PVC-type Z | 69.1 | 11 | 76 | 48.7 | 170 |
| | 16 parts by weight of graft polymer P 1 | 71.9 | 43 | 77 | 58.8 | 180 |
| | | 92.0 | 14 | 78 | 72.6 | 190 |
| | | 92.4 | 9 | 80 | 74.2 | 200 |
| I A 2 | 84 parts by weight of PVC-type Z | 72.3 | 17 | 77 | 49.2 | 170 |
| | 12 parts by weight of graft polymer P 1 | 78.9 | 47 | 78 | 61.2 | 180 |
| | 4 parts by weight of EPDM-graft polymer No. 1 | 91.6 | 39 | 79 | 71.3 | 190 |
| | | 91.5 | 31 | 79 | 73.7 | 200 |
| I A 3 | 84 parts by weight of PVC-type Z | 74.7 | 28 | 78 | 52.7 | 170 |
| | 8 parts by weight of graft polymer P 1 | 87.6 | 58 | 79 | 68.9 | 180 |
| | 8 parts by weight of EPDM-graft polymer No. 1 | 92.9 | 49 | 79 | 72.0 | 190 |
| | | 92.4 | 38 | 79 | 74.5 | 200 |
| I B 1 | 88 parts by weight of PVC-type Z | 79.1 | 9 | 77 | 50.1 | 170 |
| | 9 parts by weight of graft polymer P 1 | 94.5 | 34 | 78 | 71.2 | 180 |
| | 3 parts by weight of EPDM-graft polymer No. 2 | 102.7 | 10 | 80 | 79.2 | 190 |
| | | 101.8 | 5 | 80 | 80.4 | 200 |
| I B 2 | 88 parts by weight of PVC-type Z | 82.8 | 12 | 78 | 56.4 | 170 |
| | 6 parts by weight of graft polymer P 1 | 97.1 | 46 | 79 | 69.1 | 180 |
| | 6 parts by weight of EPDM-graft polymer No. 2 | 99.6 | 42 | 80 | 76.9 | 190 |
| | | 101.2 | 25 | 81 | 79.7 | 200 |

$a_n$ (kJ/m$^2$) at room temperature: all test specimens unbroken
It is clear from the figures quoted above that the toughness properties at increasing temperatures are improved with increasing additions of the EPDM-graft polymer. This applies for a total elastomer content of from 6 and 8% by weight.

This Example demonstrates the improvement in toughness obtained by adding an EPDM-graft polymer to mixtures of polyvinyl chloride and an EVA/PVC-graft polymer of low EVA content (EVA:PVC-ratio 1:9).

| Mixture | Composition | $H_c$, 30" (MPa) | $a_k$, 23° C. (kJ/m$^2$) | Vicat (°C.) | $\sigma$bF (MPa) | Processing temp. °C. |
|---|---|---|---|---|---|---|
| II A 1 | 80 parts by weight of graft Polymer P 2 | 74.1 | 12 | 77 | 48.3 | 170 |
| | 20 parts by weight of PVC-type Z | 78.5 | 48 | 77 | 55.3 | 180 |
| | | 92.8 | 21 | 79 | 76.4 | 190 |
| | | 92.7 | 8 | 79 | 78.2 | 200 |
| II A 2 | 60 parts by weight of graft polymer P 2 | 77.5 | 20 | 77 | 50.6 | 170 |
| | 36 parts by weight of PVC-type Z | 93.6 | 54 | 79 | 71.8 | 180 |
| | 4 parts by weight of EPDM-graft polymer No. 1 | 99.9 | 44 | 79 | 77.0 | 190 |
| | | 104.5 | 34 | 80 | 79.5 | 200 |
| II A 3 | 40 parts by weight of graft polymer P 2 | 81.7 | 49 | 77 | 57.6 | 170 |
| | 52 parts by weight of PVC-type Z | 88.9 | 69 | 78 | 64.6 | 180 |
| | 8 parts by weight of EPDM-graft polymer No. 1 | 96.2 | 55 | 79 | 72.8 | 190 |
| | | 101.4 | 42 | 80 | 78.1 | 200 |
| II B 1 | 60 parts by weight of graft polymer P 2 | 34.5 | 27 | 78 | 59.4 | 170 |
| | 40 parts by weight of EPDM-graft polymer No. 1 | 98.2 | 11 | 79 | 70.5 | 180 |
| | | 102.7 | 5 | 80 | 78.2 | 190 |
| | | 101.6 | 4 | 79 | 80.1 | 200 |
| II B 2 | 45 parts by weight of graft polymer P 2 | 90.8 | 25 | 79 | 62.6 | 170 |
| | 52 parts by weight of PVC-type Z | 96.9 | 54 | 79 | 75.9 | 180 |
| | 3 parts by weight of EPDM-graft polymer No. 1 | 96.1 | 48 | 80 | 79.9 | 190 |
| | | 106.2 | 26 | 81 | 79.8 | 200 |

$a_n$ (kJ/m$^2$) at room temperature, all test specimens unbroken
For a constant total elastomer content of 8% by weight, the notched impact strength increases with increasing addition of EPDM-graft polymer. In addition, it can clearly be seen that, at elevated processing temperatures of up to 200° C., the pure EVA-system gradually loses its toughness, whereas the products according to the invention show hardly any decrease in toughness. The same observation is made in the case of a mixture(II b 1, II b 2) which has a total elastomer content of only 6%.

High impact mixtures of polyvinyl chloride and EVA-copolymers are also improved by the addition of EPDM-graft polymers both in regard to absolute toughness and also in regard to the stability of notched impact strength with increasing processing load.

| Mixture | Composition | $H_C$ 30" (MPa) | $a_k$, 23° C. (kJ/m$^2$) | $a_k$ ±0° C. (kJ/m$^2$) | $a_k$ −20° C. (kJ/m$^2$) | Vicat (°C.) | σbF (MPa) | Processing temp. (°C.) |
|---|---|---|---|---|---|---|---|---|
| III A 1 | 92 parts by weight of PVC-type Y | 87.0 | 51 | 11 | 7 | 79 | 64.0 | 170 |
| | 8 parts by weight of EVA 1 | 93.0 | 29 | 7 | 4 | 79 | 77.0 | 180 |
| | | 95.0 | 10 | 5 | 3 | 80 | 77.1 | 190 |
| | | 96.9 | 4 | 4 | 3 | 80 | 80.4 | 200 |
| III A 2 | 90 parts by weight of PVC-type Y | 84.2 | 57 | 14 | 10 | 80 | 68.5 | 170 |
| | 6 parts by weight of EVA 1 | 95.0 | 55 | 13 | 9 | 80 | 75.6 | 180 |
| | 4 parts by weight of EPDM-graft polymer No. 1 | 94.8 | 38 | 9 | 8 | 80 | 76.1 | 190 |
| | | 95.7 | 27 | 8 | 7 | 80 | 78.7 | 200 |
| III A 3 | 88 parts by weight of PVC-type Y | 86.5 | 65 | 21 | 14 | 80 | 72.2 | 170 |
| | 4 parts by weight of EVA 1 | 93.7 | 59 | 16 | 12 | 81 | 75.1 | 180 |
| | 8 parts by weight of EPDM-graft polymer No. 1 | 94.1 | 47 | 14 | 11 | 80 | 79.4 | 190 |
| | | 96.2 | 41 | 14 | 9 | 80 | 78.5 | 200 |

The improvement in notched impact strength at ±0° and −20° C. is particularly conspicuous. However, as III A 2 and III A 3 show, increasing additions of EPDM-graft polymer also produce a distinct increase in toughness at high processing temperature in comparison with the pure EVA/PVC-system.

Further mixtures of PVC with EVA-types of different VAC-content, and their broadening by the addition of EPDM/SAN-graft polymers, are described in the following:

| Mixture | Composition | $H_C$ 30" (MPa) | $a_k$, 23° C. (kJ/m$^2$) | Vicat (°C.) | Processing temp. (°C.) |
|---|---|---|---|---|---|
| III B 1 | 92 parts by weight of PVC-type Y | 94.5 | 19 | 80 | 180 |
| | 8 parts by weight of EVA 4 | 96.3 | 7 | 81 | 190 |
| III B 2 | 88 parts by weight of PVC-type Y | 95.1 | 28 | 81 | 180 |
| | 4 parts by weight of EVA 4 | 98.7 | 25 | 81 | 190 |
| | 8 parts by weight of EPDM-graft polymer No. 1 | | | | |
| III C 1 | 92 parts by weight of PVC-type Y | 92.4 | 21 | 81 | 180 |
| | 8 parts by weight of EVA 5 | 96.9 | 5 | 81 | 190 |
| III C 2 | 88 parts by weight of PVC-type Y | 99.4 | 31 | 81 | 180 |
| | 4 parts by weight of EVA 5 | 101.2 | 21 | 81 | 190 |
| | 8 parts by weight of EPDM-graft polymer No. 1 | | | | |

$a_n$ (kJ/m$^2$) at room temperature: all test specimens unbroken

Whereas Examples I to III showed that the notched impact strength of the mixtures according to the invention is influenced to a limited extent only by increasing processing temperatures, Example IV below illustrates the co-relation between the processing time at constant temperature (180° C.) and the resulting notched impact strength.

| Mixture | Composition | $H_C$ 30" (MPa) | $a_k$, 23° C. (kJ/m$^2$) | Vicat (°C.) | σbF (MPa) | Rolling Time (minutes) |
|---|---|---|---|---|---|---|
| IV A 1 | 60 parts by weight of graft polymer P 2 | 98.2 | 11 | 79 | 70.5 | 10 |
| | 40 parts by weight of PVC-type Z | 98.6 | 6 | 79 | 72.3 | 15 |
| | | 99.5 | 5 | 79 | 71.4 | 20 |
| | | 98.7 | 5 | 79 | 71.9 | 25 |
| | | 98.7 | 4 | 80 | 72.8 | 30 |
| IV A 2 | 45 parts by weight of graft polymer P 2 | 96.4 | 49 | 79 | 75.9 | 10 |
| | 52 parts by weight of PVC-type Z | 99.1 | 42 | 80 | 78.9 | 15 |
| | 3 parts by weight of EPDM-graft polymer No. 1 | 102.8 | 33 | 80 | 79.1 | 20 |
| | | 101.7 | 17 | 80 | 80.3 | 25 |
| | | 102.1 | 7 | 80 | 79.5 | 30 |
| IV A 3 | 30 parts by weight of graft polymer P 2 | 98.0 | 50 | 81 | 76.8 | 10 |
| | 64 parts by weight of PVC-type Z | 100.4 | 46 | 80 | 81.2 | 15 |
| | 6 parts by weight of EPDM-graft polymer No. 1 | 102.3 | 42 | 80 | 81.2 | 20 |
| | | 99.7 | 45 | 80 | 79.6 | 25 |
| | | 101.9 | 46 | 82 | 80.3 | 30 |
| IV A 4 | 15 parts by weight of graft polymer P 2 | 98.2 | 67 | 79 | 78.3 | 10 |
| | 76 parts by weight of PVC-type Z | 100.8 | 63 | 80 | 79.4 | 15 |
| | 9 parts by weight of EPDM-graft polymer No. 1 | 100.0 | 59 | 80 | 81.2 | 20 |
| | | 101.7 | 54 | 82 | 79.6 | 25 |
| | | 102.0 | 58 | 82 | 79.5 | 30 |

$a_n$(kJ/m$^2$) at room temperature: all test specimens unbroken
Whereas the notched impact strength of a pure EVAC/PVC-system with an elastomer content of 6% has fallen to the level o rigid PVC after a rolling time of only 15 minutes, the mixtures produced with an addition of EPDM-graft polymers show a distinct decrease in sensitivity to processing during the rolling time in question with increasing EPDM-content. At the same time, it is obvious in this case, too, that the absolute level of notched impact strength is far above that of the EVA/PVC-system.

The following Example demonstrates that the toughness of EVA/PVC-systems is improved simply by adding EPDM-graft polymers in which the ratio of graft base to grafted on monomers lies within the claimed range.

| Mixture | Composition | $H_C$ 30" (MPa) | $a_k$, 23° C. (kJ/m$^2$) | Vicat (°C.) | σbF (MPa) | Processing temp. (°C.) |
|---|---|---|---|---|---|---|
| V A 1 | 84 parts by weight of PVC-type Z | 69.1 | 11 | 76 | 48.7 | 170 |

The following Example demonstrates that the toughness of EVA/PVC-systems is improved simply by adding EPDM-graft polymers in which the ratio of graft base to grafted on monomers lies within the claimed range.

| Mixture | Composition | $H_c,30''$ (MPa) | $a_k,23°$ C. (kJ/m$^2$) | Vicat (°C.) | $\sigma bF$ (MPa) | Processing temp. (°C.) |
|---|---|---|---|---|---|---|
| | 16 parts by weight of graft polymer P 1 | 71.9 | 43 | 77 | 58.8 | 180 |
| | | 92.0 | 14 | 78 | 72.6 | 190 |
| | | 92.4 | 9 | 80 | 74.2 | 200 |
| V A 2 | 87 parts by weight of PVC-type Z | 101.2 | 8 | 79 | 76.9 | 170 |
| | 8 parts by weight of graft polymer P 1 | 99.8 | 5 | 80 | 78.5 | 180 |
| | 5 parts by weight of EPDM-graft polymer No. 5 | 104.1 | 4 | 80 | 81.3 | 190 |
| | | 104.0 | 4 | 81 | 84.3 | 200 |
| V A 3 | 83.1 parts by weight of PVC-type Z | 75.1 | 22 | 78 | 52.4 | 170 |
| | 8.0 parts by weight of graft polymer P 1 | 82.7 | 48 | 78 | 61.7 | 180 |
| | 8.9 parts by weight of EPDM-graft polymer No. 5 | 91.4 | 38 | 79 | 70.0 | 190 |
| | | 92.9 | 32 | 80 | 75.6 | 200 |
| V A 3 | 78.7 parts by weight of PVC-type Z | 94.2 | 7 | 80 | 74.7 | 170 |
| | 8.0 parts by weight of graft polymer P 1 | 97.0 | 6 | 81 | 74.2 | 180 |
| | 13.3 parts by weight of EPDM-graft polymer No. 4 | 102.5 | 4 | 81 | 79.1 | 190 |
| | | 105.4 | 3 | 81 | 82.2 | 200 |

$a_n$ (kJ/m$^2$) at room temperature, all test specimens unbroken

Thus, the use of an EPDM-graft polymer with a rubber content of 80% by weight is ineffectual. The same applies to an EPDM-graft polymer with a rubber content of only 30% by weight. Example V A 3 again demonstrates the effectiveness of a mixture falling within the range according to the invention in comparison with the unmodified product V A 1.

The following Example shows that graft polymers produced with mixtures of EPDM-rubber and EVA-copolymers as the graft base are also distinctly superior in their toughness to graft products only containing EVA.

| Mixture | Composition | $H_c30''$ (MPa) | $a_k,23°$ C. (kJ/m$^2$) | Vicat (°C.) | $\sigma bF$ (MPa) |
|---|---|---|---|---|---|
| VI A 1 | 88 parts by weight of PVC-type Y<br>12 parts by weight of graft polymer P 1 | 102.4 | 5 | 79 | 81.5 |
| VI A 2 | 88 parts by weight of PVC-type Y<br>12 parts by weight of EPDM/EVA-graft polymer No. 7 | 99.1 | 26 | 81 | 80.6 |
| VI A 3 | 88 parts by weight of PVC-type Y<br>12 parts by weight of EPDM/EVA-graft polymer No. 6 | 98.1 | 45 | 80 | 78.2 |

$a_n$ (kJ/m$^2$) at room temperature, all test specimens unbroken

The processing temperature for all mixtures was 180° C. (10 minutes' rolling; 10 minutes' pressing, as explained in the general part of the Examples). Whereas, under the processing conditions indicated, which are entirely consistent with those applied in practice, the mixture containing 6% of EVA shows a notched impact strength of only 5 kJ/m$^2$, notched impact strengths of 26 and 45 kJ/m$^2$ are obtained in cases where the graft polymers according to the invention are used.

Mixtures of the following composition were subjected to the Weatherometer test mentioned in the general introduction to the Examples in order to determine resistance to light and ageing:

| Mixture I A 1 according to Example I | |
|---|---|
| 84% by weight of PVC-type Z<br>16% by weight of graft polymer P 1<br>additionally containing 3% by weight of TiO$_2$, based on total mixture<br>Processing temperature 180° C. | 84% by weight of PVC-type Z<br>8% by weight of graft polymer P 1<br>8% by weight of EPDM-graft polymer No. 1<br>additionally containing 3% by weight of TiO$_2$, based on total mixture<br>Processing temperature 180° C. |

Neither mixture shows any change in relation to the 0-value after 3000 hours in the Weatherometer.

What we claim is:

1. A thermoplastic moulding composition comprising (a) 75 to 99 parts by weight of a graft polymer of 90 to 99% of vinyl chloride onto 1 to 10% by weight of an ethylene vinyl ester copolymer, and (c) 1 to 25 parts by weight of a graft polymer consisting essentially of ethylene propylene terpolymer rubber onto which is grafted a member selected from the group consisting of styrene, methylmethacrylate, a mixture of styrene and methlymethacrylate, and a mixture of styrene and acrylonitrile.

2. A moulding composition as claimed in claim 1, wherein the ethylene vinyl ester copolymer is an ethylene vinyl acetate copolymer with a vinyl acetate content of from 20 to 80% by weight.

3. A moulding composition as claimed in claim 2, wherein the ethylene vinyl acetate copolymer has a vinyl acetate content of from 25 to 55% by weight.

4. A moulding composition as claimed in claim 1, wherein the graft base of component (b) contains 1 to 15 carbon-carbon double bonds per 1000 carbon atoms.

5. A moulding composition as claimed in claim 1, wherein the ethylene-propylene terpolymer constitutes at most 18% by weight of the total composition.

* * * * *